US012627799B2

(12) United States Patent
Gao et al.

(10) Patent No.: US 12,627,799 B2
(45) Date of Patent: May 12, 2026

(54) CCSO WITH DOWNSAMPLING FILTERS METHODS

(71) Applicant: Tencent America LLC, Palo Alto, CA (US)

(72) Inventors: Han Gao, Palo Alto, CA (US); Xin Zhao, Palo Alto, CA (US); Liang Zhao, Palo Alto, CA (US); Shan Liu, Palo Alto, CA (US); Jing Ye, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/660,052

(22) Filed: May 9, 2024

(65) Prior Publication Data

US 2025/0142061 A1     May 1, 2025

Related U.S. Application Data

(60) Provisional application No. 63/545,885, filed on Oct. 26, 2023.

(51) Int. Cl.
H04N 19/00        (2014.01)
G06V 20/40        (2022.01)
(Continued)

(52) U.S. Cl.
CPC ........... H04N 19/117 (2014.11); G06V 20/41 (2022.01); H04N 19/132 (2014.11); H04N 19/14 (2014.11);
(Continued)

(58) Field of Classification Search
None
See application file for complete search history.

(56) References Cited

U.S. PATENT DOCUMENTS

2018/0124400 A1    5/2018  He et al.
2018/0160134 A1*   6/2018  Zhang .................... H04N 19/61
(Continued)

FOREIGN PATENT DOCUMENTS

WO     WO 2022040428 A1    2/2022

OTHER PUBLICATIONS

Han Gao et al., "Wedge Mode Extensions", Alliance for Open Media, Codec Working Group, Document: CWG-C092_v1, Dec. 2022, 4 pgs.

(Continued)

*Primary Examiner* — Zhihan Zhou
(74) *Attorney, Agent, or Firm* — Morgan, Lewis & Bockius LLP

(57)            ABSTRACT

Various implementations described herein include methods and systems for coding video. In one aspect, a video bitstream includes a current image frame and a first syntax element for a cross-component sample offset (CCSO) mode. The first syntax element indicates whether to generate a first sample offset of a first color sample of the current image frame based on one or more luma samples. An electronic device identifies a first luma sample that is collocated with the first color sample and neighboring luma sample(s) s of the first luma sample. The first luma sample and the one neighboring luma sample(s) are downsampled to generate downsampled luma sample(s) for the CCSO mode. The electronic device determines the first sample offset of the first color sample based on the downsampled luma sample (s), and reconstructs the current image frame at least by adjusting the first color sample based on the first sample offset.

21 Claims, 7 Drawing Sheets

(51) Int. Cl.

| | |
|---|---|
| *H04N 19/117* | (2014.01) |
| *H04N 19/132* | (2014.01) |
| *H04N 19/14* | (2014.01) |
| *H04N 19/186* | (2014.01) |
| *H04N 19/196* | (2014.01) |
| *H04N 19/70* | (2014.01) |

(52) U.S. Cl.
CPC ......... *H04N 19/186* (2014.11); *H04N 19/196* (2014.11); *H04N 19/70* (2014.11)

(56) References Cited

U.S. PATENT DOCUMENTS

| | | | |
|---|---|---|---|
| 2022/0030271 A1 | 1/2022 | Li et al. | |
| 2022/0182635 A1* | 6/2022 | Li | H04N 19/186 |
| 2022/0272336 A1* | 8/2022 | Tourapis | H04N 19/136 |
| 2022/0337847 A1 | 10/2022 | Chen et al. | |
| 2022/0368928 A1* | 11/2022 | Ma | H04N 19/176 |
| 2023/0143151 A1 | 5/2023 | Krishnan et al. | |
| 2023/0209093 A1* | 6/2023 | Kuo | H04N 19/70 |
| | | | 375/240.26 |
| 2023/0319315 A1 | 10/2023 | Kuo et al. | |
| 2023/0336748 A1* | 10/2023 | Ye | H04N 19/70 |
| 2024/0259578 A1* | 8/2024 | Kuo | H04N 19/124 |

OTHER PUBLICATIONS

Peter de Rivaz et al., "AV1 Bitstream & Decoding Process Specification", Version 1.0.0 with Errata 1, Alliance for Open Media, Jan. 2019, 681 pgs.

Xin Zhao et al., "CWG-B099: Improved CCSO with Luma Extension and Band Feature", Alliance for Open Media, Codec Working Group, Jan. 2022, 5 pgs.

Tencent America LLC, ISRWO, PCT/US2024/030268, Jul. 9, 2024, 17 pgs.

Tencent America LLC, ISRWO, PCT/US2024/030273, Aug. 26, 2024, 12 pgs.

Tencent America LLC, ISRWO, PCT/US2024/030397, Aug. 28, 2024, 17 pgs.

Che-Wei Kuo et al., "Cross-Component Sample Adaptive Offset", 2022 Data Compression Conference (DCC), Mar. 2022, 10 pgs., Retrieved from the Internet: https://ieeexplore.ieee.org/abstract/document/9810701.

Xin Zhao et al., "Study on Coding Tools Beyond AV1", 2021 IEEE International Conference on Multimedia and Expo (ICME), Jul. 2021, 6 pgs., Retrieved from the Internet: https://ieeexplore.ieee.org/abstract/document/9428244.

Yixin Du et al., "Cross-Component Sample Offset for Image and Video Coding", 2021 International Conference on Visual Communications and Image Processing (VCIP), Dec. 2021, 5 pgs., Retrieved from the Internet: https://ieeexplore.ieee.org/abstract/document/9675355.

\* cited by examiner

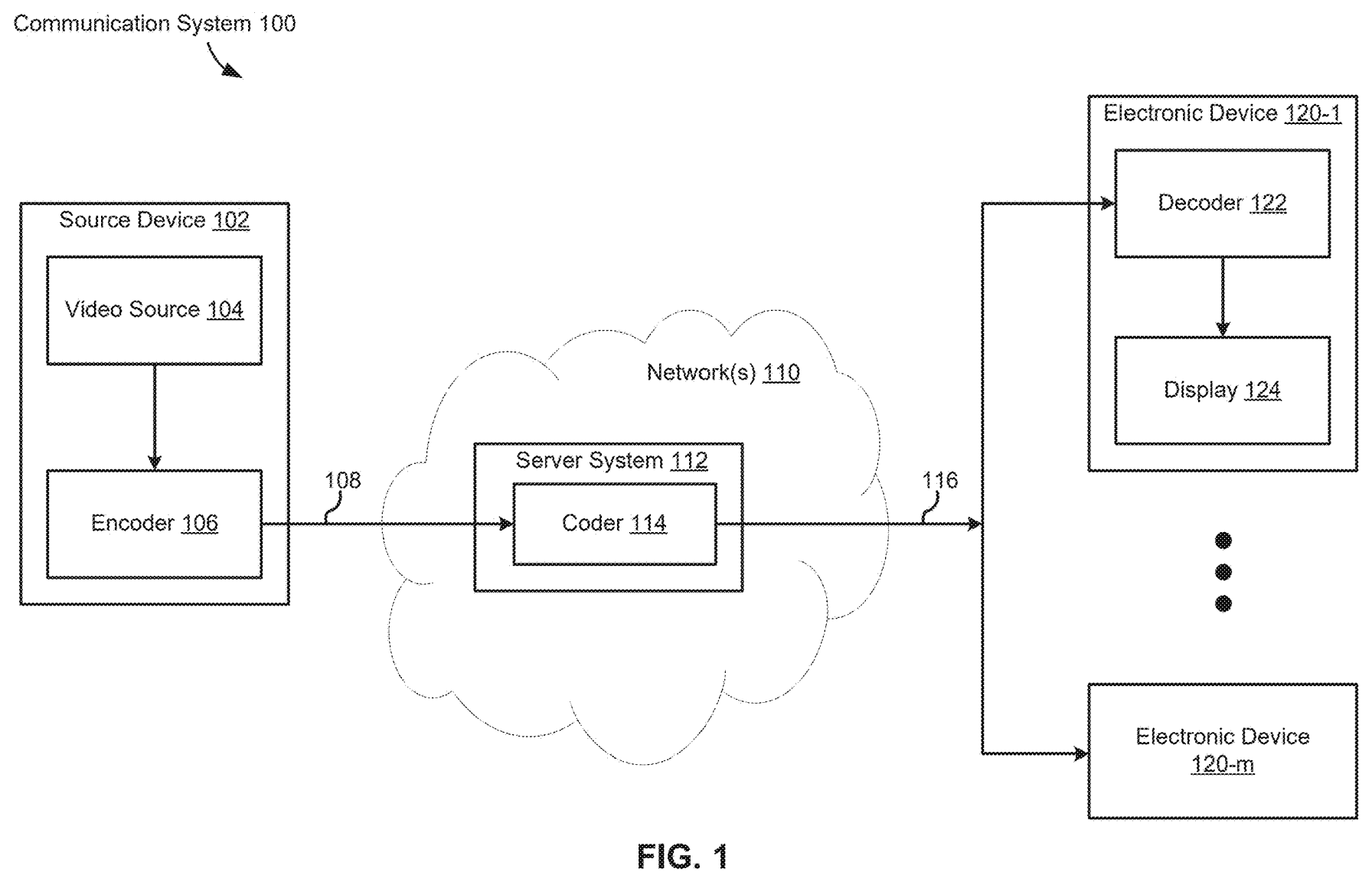

Communication System 100

Source Device 102

Video Source 104

Encoder 106

108

Network(s) 110

Server System 112

Coder 114

116

Electronic Device 120-1

Decoder 122

Display 124

Electronic Device 120-m

FIG. 1

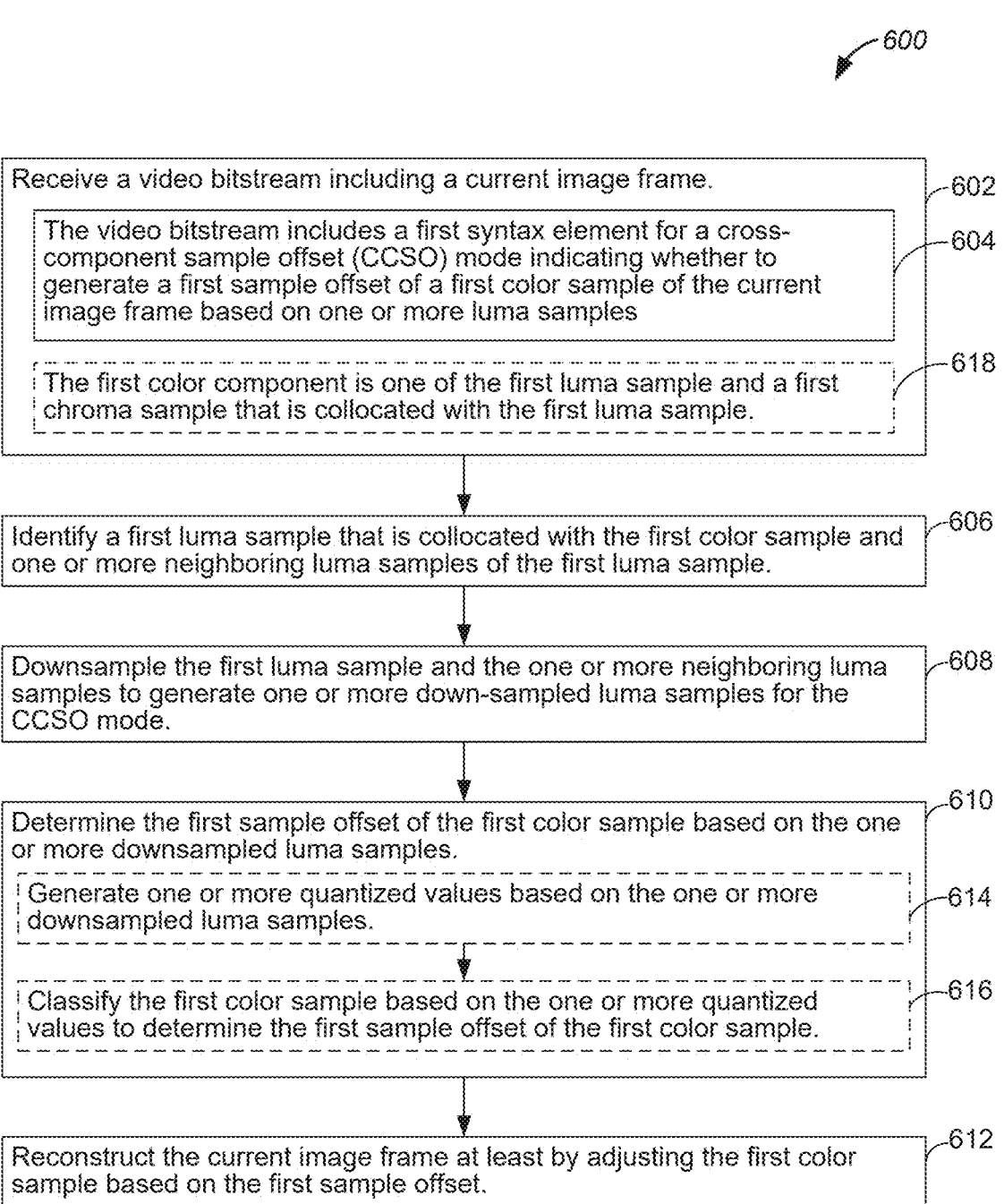

_600_

Receive a video bitstream including a current image frame. ⎤_602

The video bitstream includes a first syntax element for a cross-component sample offset (CCSO) mode indicating whether to generate a first sample offset of a first color sample of the current image frame based on one or more luma samples ⎤_604

The first color component is one of the first luma sample and a first chroma sample that is collocated with the first luma sample. ⎤_618

Identify a first luma sample that is collocated with the first color sample and one or more neighboring luma samples of the first luma sample. ⎤_606

Downsample the first luma sample and the one or more neighboring luma samples to generate one or more down-sampled luma samples for the CCSO mode. ⎤_608

Determine the first sample offset of the first color sample based on the one or more downsampled luma samples. ⎤_610

Generate one or more quantized values based on the one or more downsampled luma samples. ⎤_614

Classify the first color sample based on the one or more quantized values to determine the first sample offset of the first color sample. ⎤_616

Reconstruct the current image frame at least by adjusting the first color sample based on the first sample offset. ⎤_612

FIG. 6

CCSO WITH DOWNSAMPLING FILTERS METHODS

RELATED APPLICATIONS

This application claims priority to U.S. Provisional Patent Application No. 63/545,885, entitled "CCSO with Downsampling Filters Methods," filed Oct. 26, 2023, which is hereby incorporated by reference in its entirety.

TECHNICAL FIELD

The disclosed embodiments relate generally to video coding, including but not limited to systems and methods for loop filtering (e.g., cross-component offset filtering) of video data.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes methods, systems, and non-transitory computer-readable storage media for applying a loop filter for video (image) compression. A video codec includes a plurality of function modules for one or more of: intra/inter prediction, transform coding, quantization, entropy coding, and in-loop filtering. In-loop filtering technologies are applied to adjust reconstructed picture samples to further reduce a reconstruction error. A cross-component offset filtering method is implemented to apply a co-located reconstructed sample and associated neighboring reconstructed samples of a first color component to derive an offset value that is added on a current sample of a second color component, thereby adjusting a reconstruction value of the current sample. Examples of the first color component is a luma color component, and examples of the second color component is a chroma color component. In some implementations, the first color component and the second color component correspond to the same color component, e.g., luma sample.

In various embodiments of this application, a downsampling filter (also called a chroma from luma filter) is applied to samples of a first color component to generate downsampled samples of a first color component, and the downsampled samples are processed by a cross-component offset filter to determine an offset value that is added on a sample of a second color component. For example, downsampled luma samples are applied to generate an offset value of a first luma sample or a first chroma sample that is collocated with the first luma sample. A filter type of the downsampling filter is defined by one or more filter coefficients, a filter shape, and one or more filter tap positions.

In accordance with some embodiments, a method of video decoding is provided. The method includes receiving a video bitstream including a current image frame, and the video bitstream includes a first syntax element for a cross-component sample offset (CCSO) mode indicating whether to generate a first sample offset of a first color sample of the current image frame based on one or more luma samples. The method further includes identifying a first luma sample that is collocated with the first color sample and one or more neighboring luma samples of the first luma sample. The method further includes downsampling the first luma sample and the one or more neighboring luma samples to generate one or more downsampled luma samples for the CCSO mode, determining the first sample offset of the first color sample based on the one or more downsampled luma samples, and reconstructing the current image frame at least by adjusting the first color sample based on the first sample offset.

In accordance with some embodiments, a method of video encoding is provided. The method includes receiving video data comprising a current image frame, encoding the current image frame, and determining that a cross-component sample offset (CCSO) mode is enabled to generate a first sample offset of a first color sample of the current image frame based on one or more luma samples. In the CCSO mode, the first sample offset of the first color sample is determined based on one or more downsampled luma samples that are generated by downsampling a first luma sample and one or more neighboring luma samples, and the first luma sample is collocated with the first color sample. The method further includes transmitting the encoded current image frame via a video bitstream and signaling, via the video bitstream, a first syntax element to indicate that the CCSO mode is applied to reconstruct the first color sample collocated with the first luma sample based on the first sample offset.

In accordance with some embodiments, a method of bitstream conversion is provided. The method includes obtaining a source video sequence including a current image frame and performing a conversion between the source video sequence and a video bitstream. The video bitstream includes the current image frame and a first syntax element for a cross-component sample offset (CCSO) mode indicating whether to generate a first sample offset of a first color sample of the current image frame based on one or more luma samples. The first sample offset of the first color sample is determined based on one or more downsampled luma samples that are generated by downsampling a first luma sample and one or more neighboring luma samples, and the first luma sample is collocated with the first color sample.

In some embodiments, the video bitstream further includes a first high-level syntax element for a type of a downsampling filter applied to downsample the first luma sample and the one or more neighboring luma samples to generate the one or more downsampled luma samples. The first high-level syntax element is signaled in one of: a sequence header, a picture header, a subpicture header, a slice header, a tile header, and a superblock header.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIG. 6 is a flow diagram illustrating a method of coding video, in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
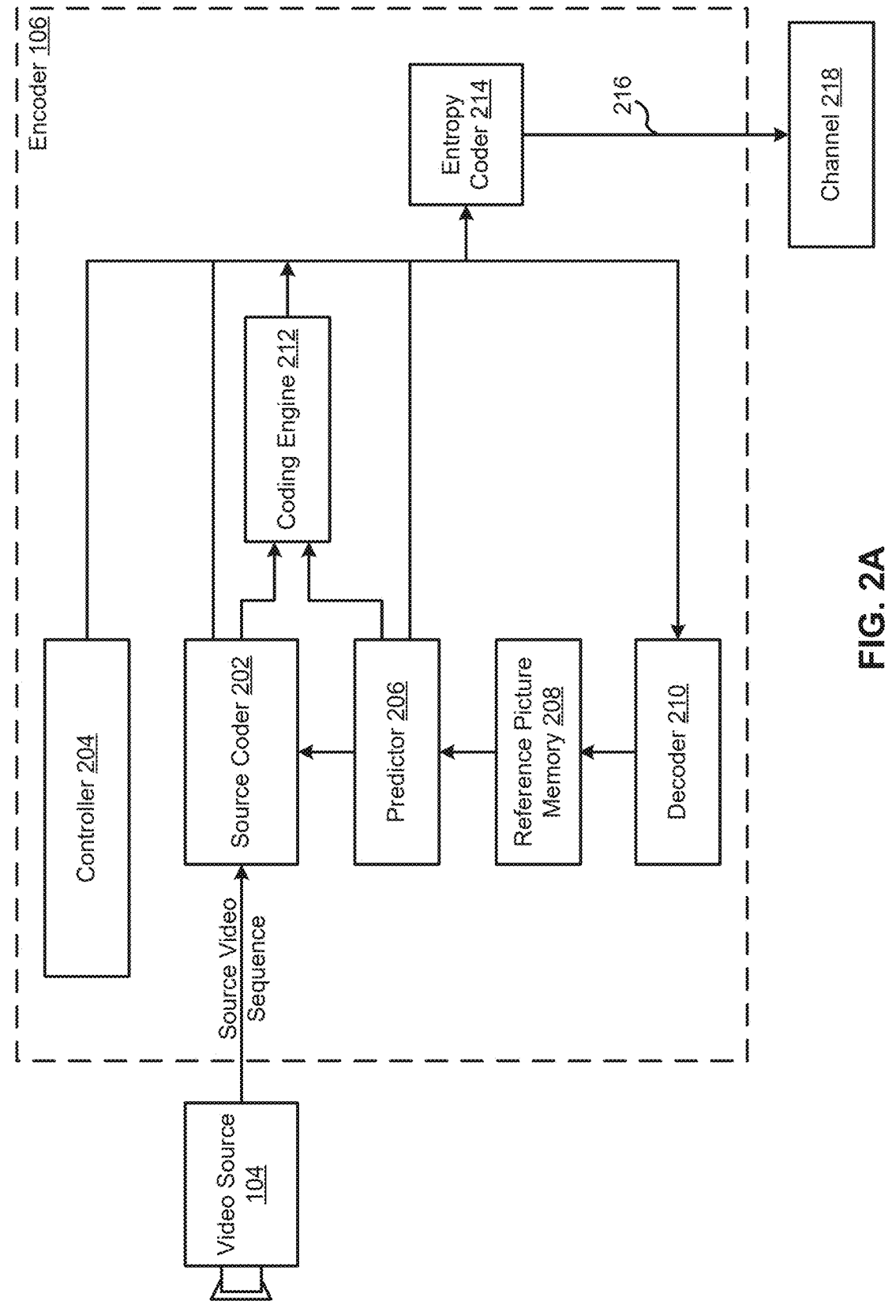
FIG. 2A is a block diagram illustrating example elements of an encoder component in accordance with some embodiments.

The present disclosure describes methods, systems, and non-transitory computer-readable storage media for applying a loop filter for video (image) compression. In-loop filtering technologies are applied to adjust reconstructed picture samples to further reduce a reconstruction error. A cross-component offset filtering method is implemented to apply a co-located reconstructed sample and associated neighboring reconstructed samples of a first color component to derive an offset value that is added on a current sample of a second color component, thereby adjusting a reconstruction value of the current sample. In various embodiments of this application, a decoder receives a video bitstream from an encoder including a current image frame, and a downsampling filter is applied to samples of a first color component to generate downsampled samples of a first color component, and the downsampled samples are processed by a cross-component offset filter to determine an offset value that is added on a sample of a second color component. For example, downsampled luma samples are applied to generate an offset value of a first luma sample or a first chroma sample that is collocated with the first luma sample.

More specifically, in some embodiments, a video decoder identifies a first luma sample and one or more neighboring luma samples of the first luma sample based on a filter shape. The decoder may determine one or more difference values between the one or more neighboring luma samples and the first luma sample. The identified luma samples or one or more difference values are quantized, e.g., using a scalar quantizer, to generate one or more quantized values. The scalar quantizer may be specified by quantization intervals (e.g., ranges of values assigned to the same integer) and quantization levels (e.g., integer values to which a quantization interval is assigned). A first color sample is classified, e.g., by a classifier, based on the one or more quantized values to determine a first sample offset of the first color sample. The first color sample is adjusted based on the first sample offset of the first color sample, thereby enabling reconstruction of the current image frame. Further, in some embodiments, the decoder uses downsampled luma samples to generate the offset value of the first color sample.

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream).

Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture (s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
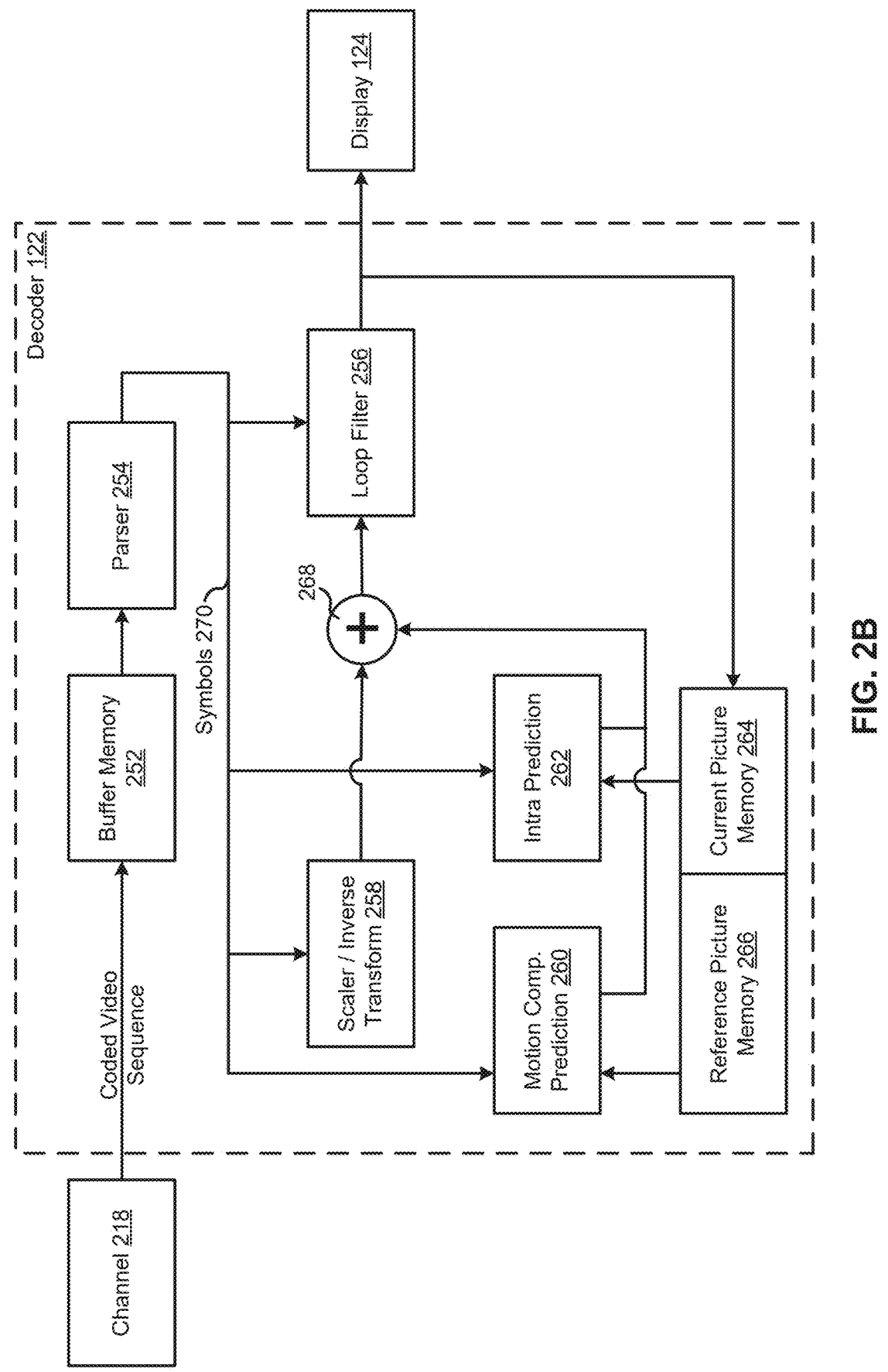
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
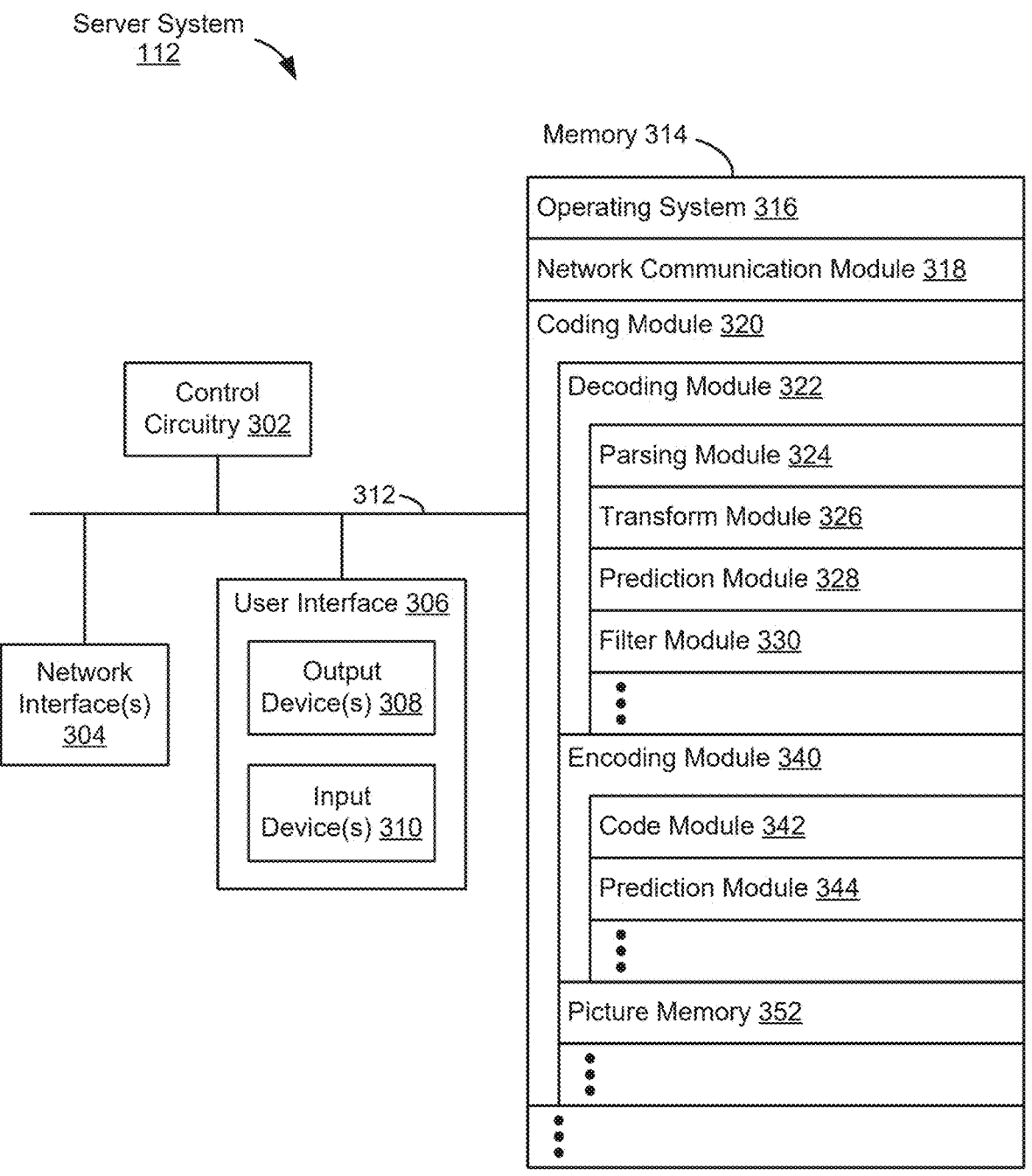
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4:
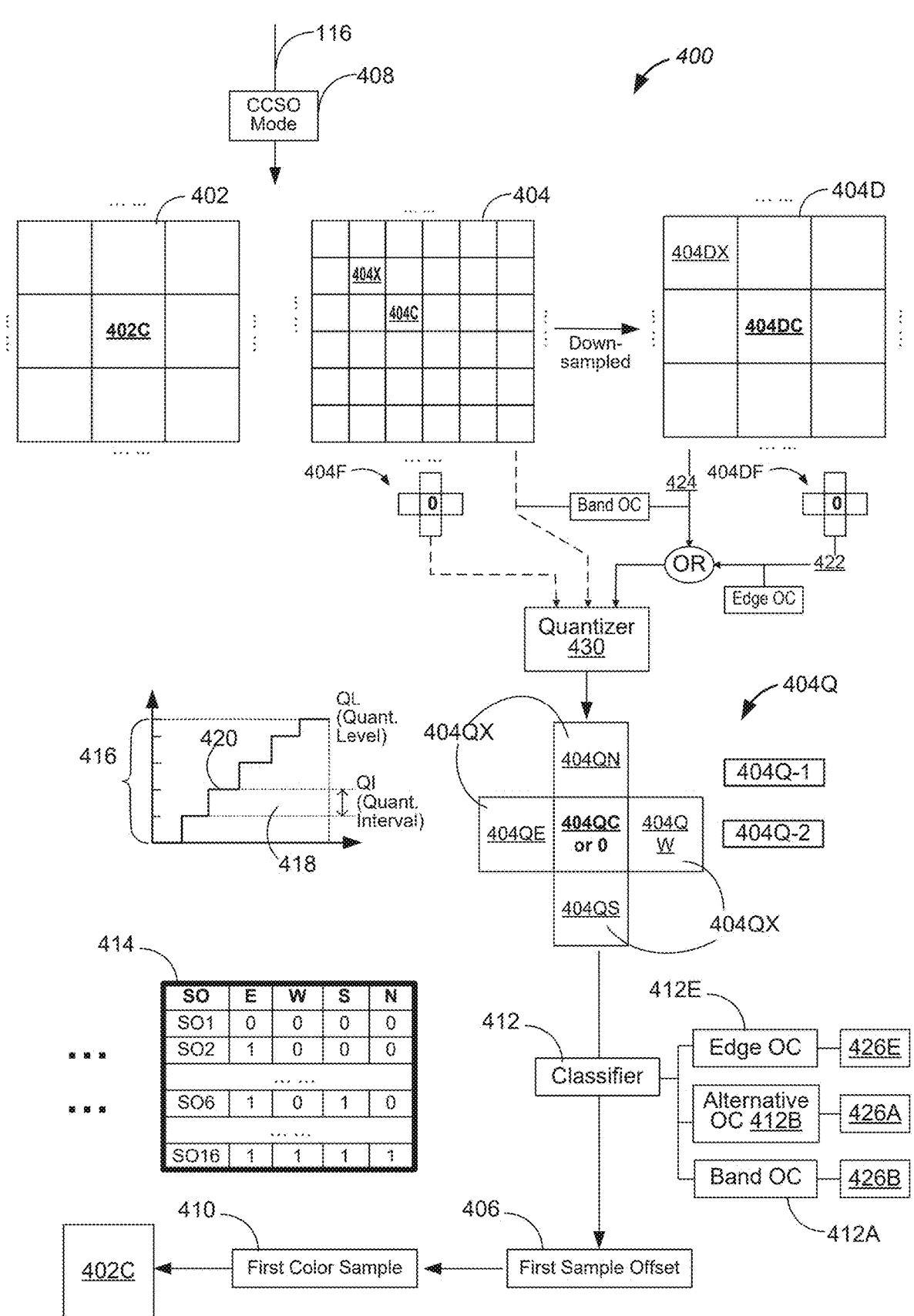
FIG. 4 is a flow diagram of an example process of applying in-loop filtering in video decoding, in accordance with some embodiments.

FIG. 4 is a flow diagram of an example process 400 of applying in-loop filtering in video decoding, in accordance with some embodiments. A GOP includes a sequence of image frames that further includes a current image frame. The current image frame includes a color image, i.e., a non-monochrome image frame, which has a plurality of color samples (e.g., chroma samples 402 and luma samples 404) co-located with one another. After the plurality of color samples of the current image frame are reconstructed, in-loop filtering is applied to adjust a subset of color samples, thereby improving an image quality of the current image frame. In some embodiments, a reconstructed sample and its neighboring reconstructed samples of a first color component are combined to derive an offset value for a first color component, and a reconstructed sample of the second color component is co-located with the reconstructed sample of the first color component and adjusted by the offset value. Alternatively, in some embodiments, reconstructed samples of the first color components are downsampled. A downsampled sample and its neighboring downsampled samples of a first color component are combined to derive an offset value for a second color component. A sample of the second color component is adjusted by the offset value. The first color component is optionally identical to or distinct from the second color component.

For example, a first luma sample 404C and its neighboring luma samples 404X are combined to derive a sample offset 406, and a first chroma sample 402C is co-located with the first luma sample 404C and adjusted by the sample offset 406. Alternatively, in another example, a first luma sample 404C and its neighboring luma samples 404X are combined to derive the sample offset 406, which is applied to adjust the first luma sample 404C itself. Alternatively, in some embodiments, a first downsampled luma sample 404DC and its neighboring downsampled luma samples 404DX are combined to derive a sample offset 406, and a first chroma sample 402C is co-located with the luma sample 404C or 404DC and adjusted by the sample offset 406. During the course of combining the luma samples 404C and 404X or the downsampled luma samples 404DC and 404DX, a loop filter 256 is applied to determine one or more of: a number, locations, and weights of neighboring luma samples 404X, which are applied to generate the sample offset 406.

More specifically, a decoder 122 receives a video bitstream 116 from an encoder 106 including the current image frame. The video bitstream 116 includes a first syntax element for a cross-component sample offset (CCSO) mode 408. The CCSO mode 408 indicates a first sample offset 406 of a first color sample 410 of the current image frame is determined based on one or more luma samples 404. The decoder 122 identifies the first luma sample 404C that is collocated with the first color sample 410 and one or more neighboring luma samples 404X of the first luma sample 404C. The first luma sample 404C and the one or more neighboring luma samples 404X are downsampled to generate one or more downsampled luma samples 404D for the CCSO mode 408. The first sample offset 406 of the first color sample 410 is determined based on one or more downsampled luma samples 404D. The decoder 122 reconstructs the current image frame at least by adjusting the first color sample 410 based on the first sample offset 406. In some embodiments, the first color sample 410 includes a first chroma sample 402C that is collocated with the first luma sample 404C. Each of the first luma sample 404C and the one or more neighboring luma samples 404X includes a respective reconstructed luma sample, and the first chroma sample 402C includes a first reconstructed chroma sample.

In some embodiments, the decoder 122 determines the first sample offset 406 of the first color sample 410 by generating one or more quantized values 404Q based on the one or more downsampled luma samples 404D and classifies the first color sample 410 based on the one or more quantized values 404Q to determine the first sample offset 406 of the first color sample 410.

In some embodiments, the CCSO mode 408 corresponds to at least an edge offset classifier 412E. Based on the edge offset classifier 412E, the decoder 122 determines that the one or more downsampled luma samples 404D include a first downsampled luma sample 404DC and one or more neighboring downsampled luma samples 404DX, and further determines one or more downsampled difference values 404DF between the one or more neighboring downsampled luma samples 404DX and the first downsampled luma sample 404DC. The one or more quantized values 404Q are generated based on the one or more downsampled difference values 404DF, e.g., which are provided (operation 422) to a quantizer 430, and applied by the edge offset classifier 412E to classify the first color sample 410. For example, a filter type has a cross shape and includes four taps. The one or more neighboring downsampled luma samples 404DX include one or more of: a north downsampled luma sample (also called an above downsampled luma sample), a south downsampled luma sample (also called a below downsampled luma sample), a west downsampled luma sample (also called a left downsampled luma sample), and an east downsampled luma sample (also called a right downsampled luma sample). The decoder 122 determines one or more downsampled difference values 404DF between the one or more neighboring downsampled luma samples 404DX and the first downsampled luma sample 404DC. For example, the one or more downsampled difference values 404DF includes one or more of: a north downsampled difference value, a south downsampled difference value, a west downsampled difference value, and an east downsampled difference value. Each of the downsampled difference values 404DF are a difference between a respective one of the neighboring downsampled luma samples 404DX and the first luma sample 404DC. The one or more difference values 404F are quantized to generate one or more quantized difference values 404QX. For example, the one or more quantized difference values 404QX includes one or more of: a north quantized difference value 404QN, a south quantized difference value 404QS, a west quantized difference value 404QW, and an east quantized difference value 404QE. Each of the downsampled difference values 404DF is provided (operation 422) to a quantizer 430, and quantized to generate a respective one of the quantized difference values 404QN, 404QS, 404QW, and 404QE.

Additionally and alternatively, in some embodiments, the CCSO mode 408 corresponds to an edge offset classifier 412E and an alternative classifier 412B. The one or more quantized values 404Q include a first quantized value 414Q-1 that is generated, and further applied by the edge offset classifier 412E to classify the first color sample 410, based on the one or more downsampled luma samples 404D. An edge classification result 426E is generated. The one or more quantized values further include a second quantized value 404Q-2 that is generated, and further applied by the alternative classifier 412A to classify the first color sample 410, based on a subset of the first luma sample 404C and the one or more neighboring luma samples 404X, which may be downsampled or may not be downsampled. An alternative classification result 426A is generated. The first sample offset 406 is determined based on the edge classification result 426E and the alternative classification result 426A. In an example, the alternative classifier 412A is the band offset classifier 412A.

In some embodiments, the CCSO mode 408 corresponds to at least a band offset classifier 412B. Based on the band offset classifier 412B, the decoder 122 determines that the one or more downsampled luma samples 404D include a first downsampled luma sample 404DC and one or more neighboring downsampled luma samples 404DX. The one or more downsampled luma samples 404D are provided (operation 424) to a quantizer 430, and used to generate one or more quantized values 404Q, which are further applied by the band offset classifier 412B to classify the first color sample 410.

Additionally and alternatively, in some embodiments, the CCSO mode corresponds to the band offset classifier 412B and an alternative classifier distinct from the band offset classifier 412B. The one or more quantized values 404Q include a first quantized value that is generated, and further applied by the band offset classifier 412B to classify the first color sample 410, based on the one or more downsampled luma samples 404D. A band classification result 426B is generated. The one or more quantized values further include a second quantized value that is generated, and further applied by the alternative classifier to classify the first color sample 410 based on a subset of the first luma sample 404C and the one or more neighboring luma samples 404X, which may be downsampled or may not be downsampled. An alternative classification result 426A is generated. The first sample offset 406 is determined based on the band classification result 426B and the alternative classification result 426A. In an example, the alternative classifier 412A is the edge offset classifier 412E.

In some embodiments, the CCSO mode 408 corresponds to a plurality of offset classifiers 412. The decoder 122 determines that the one or more downsampled luma samples 404D include a first downsampled luma sample 404DC and one or more neighboring downsampled luma samples 404DX. A subset of the one or more quantized values 404Q are generated based on the one or more downsampled luma samples 404D, and applied by at least one of the plurality of offset classifiers 412, to classify the first color sample 410 and generate a respective classification result. Another subset of the one or more quantized values 404Q may be generated based on the one or more luma samples 404 and used to generate one or more additional classification results. The first sample offset 406 is determined based on a plurality of classification results (e.g., 426A, 426B, or 426E) including the respective classification result of the at least one of the plurality of offset classifiers 412. Further, in some embodiments, the plurality of offset classifiers 412 include a band offset classifier 412B and an edge offset classifier 412E. Additionally, in some embodiments, the plurality of offset classifiers 412 include at least an edge offset classifier 412E. The decoder 122 further determines one or more downsampled difference values 404DF between the one or more neighboring downsampled luma samples 404DX and the first downsampled luma sample 404DC. The one or more quantized values 404Q are generated based on the one or more downsampled difference values 404DF, and applied by the edge offset classifier 412E, to classify the first color sample 410 and generate an edge classification result 426E.

Alternatively and additionally, in some embodiments, the decoder 122 further determines one or more difference values 404F between the one or more neighboring luma samples 404X and the first luma sample 404C. A first subset of the one or more quantized values 404Q is generated based on the one or more difference values 404F, and applied by the edge offset classifier 412E, to generate an edge classification result 426E. A second subset of the one or more quantized values 404Q is generated based on the one or more downsampled luma samples 404D, and applied by the band offset classifier 412B, to generate a band classification result 426B. The edge classification result 426E and the band classification result 426B are used to determine the first sample offset 406 and the first color sample 410.

The first color sample 410 is adjusted based on the first sample offset 406 of the first color sample 410, thereby enabling reconstruction of the current image frame. In some embodiments, the first color sample 410 includes a first chroma sample 402C that is co-located with the first luma sample 404C in the current image frame, and the first chroma sample 402C is adjusted based on the first sample offset 406. Alternatively, in some embodiments, the first color sample 410 is the first luma sample 404C, and the first luma sample 404C is adjusted based on the first sample offset 406.

In some embodiments, one or more luma samples 404, one or more difference values 404F, one or more downsampled luma samples 404D, or one or more downsampled difference values 404DF are quantized to a plurality of integer values in a quantization range 416 using a scalar quantizer 430 including a plurality of quantization intervals 418 (QI) and a plurality of quantization levels 420 (QL), and each of the one or more quantized values 404Q includes a respective integer in the quantization range 416. For each integer value in the quantization range 416, a quantization interval 418 is defined to be a range of values 404, 404F, 404D, or 404DF assigned to the respective integer value. A quantization level 420 corresponds to the respective integer value to which the range of difference values associated with the quantization interval 418 are assigned.

The first color sample 410 is classified, e.g., by a classifier 412, based on the one or more quantized values 404QX to determine the first sample offset 406 of the first color sample 410. In an example, the quantized values 404QX include the quantized values 404QN, 404QS, 404QW, and 404QE. A lookup table 414 maps a plurality of combinations of the quantized values 404QN, 404QS, 404QW, and 404QE to different sample offset options SO (e.g., SO1-SQ16). Based on the lookup table 414, the quantized values 404QX corresponds to one of the combinations in the lookup table 414, and a corresponding sample offset option SO is identified to correspond to a combination of the quantized difference values 404QX and therefore selected for the first sample offset 406. In other words, in some embodiments, the decoder 122 classifies the first color sample 410 by identifying a combination of the one or more quantized values 404QX in a lookup table 414 associating a plurality of quantized combinations with a plurality of offset value options SO (e.g., SO1-SO16) and determining the first sample offset 406 corresponding to the combination of the one or more quantized values in the lookup table 414.

Figure 5:
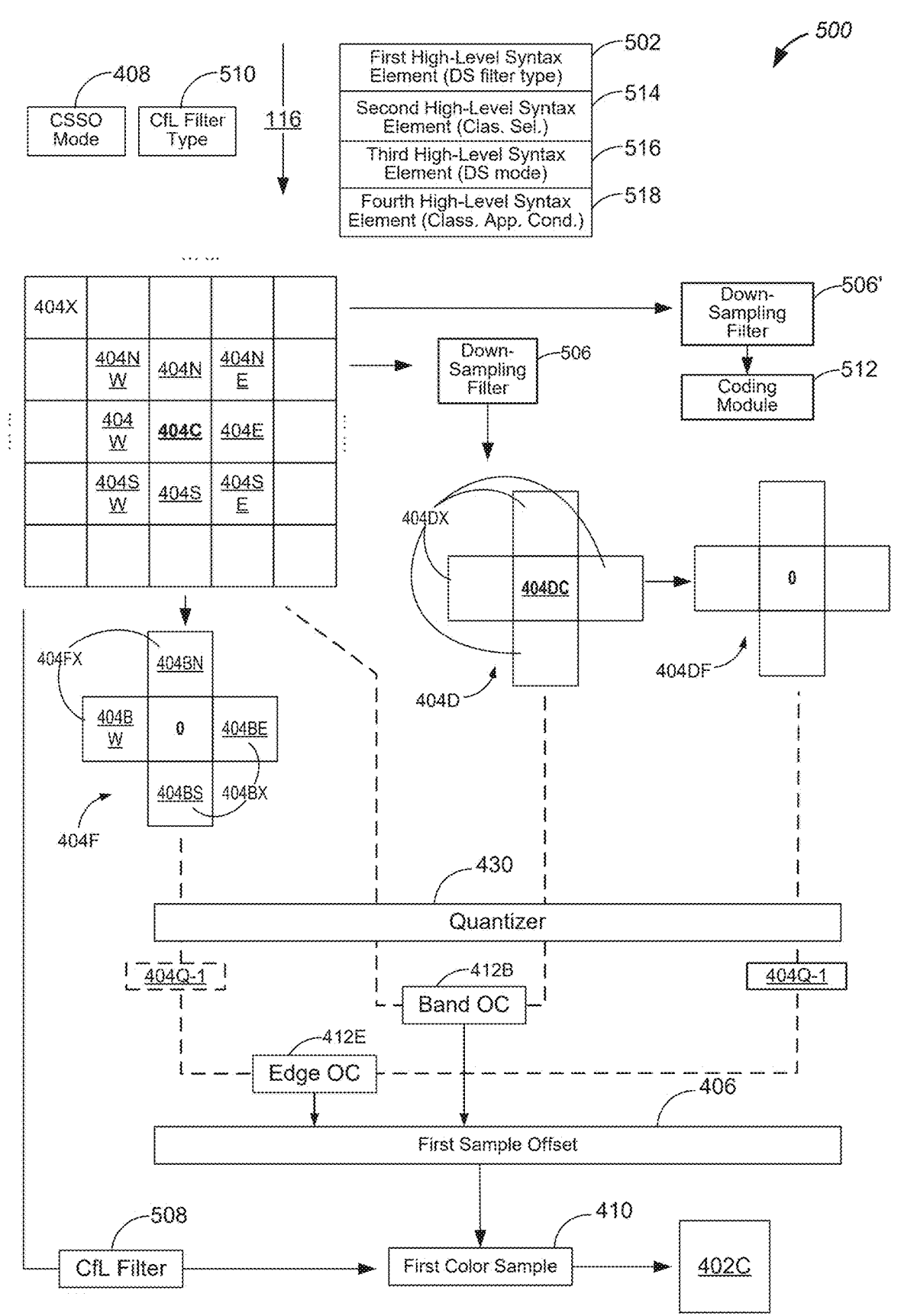
FIG. 5 is a flow diagram of another example process of applying in-loop filtering in video decoding, in accordance with some embodiments.

FIG. 5 is a flow diagram of another example process 500 of applying in-loop filtering in video decoding, in accordance with some embodiments. A decoder 122 receives a video bitstream 116 from an encoder 106 including the current image frame. The video bitstream 116 includes a first syntax element for a CCSO mode 408. The CCSO mode 408 indicates a first sample offset 406 of a first color sample 410 of the current image frame is determined based on one or more luma samples 404. The decoder 122 identifies the first luma sample 404C that is collocated with the first color sample 410 and one or more neighboring luma samples 404X of the first luma sample 404C. The first luma sample 404C and the one or more neighboring luma samples 404X are downsampled to generate one or more downsampled luma samples 404D for the CCSO mode 408. The first sample offset 406 of the first color sample 410 is determined based on the one or more downsampled luma samples 404D. The decoder 122 reconstructs the current image frame at least by adjusting the first color sample 410 based on the first sample offset 406. In some embodiments, the first color sample 410 includes a first chroma sample 402C that is collocated with the first luma sample 404C.

In some embodiments, the video bitstream 116 further includes a first high-level syntax element 502 for a type of a downsampling filter 506 applied to downsample the first luma sample 404C and the one or more neighboring luma samples 404X to generate the one or more downsampled luma samples 404D. The first high-level syntax element 502 is signaled in one of: a sequence header, a picture header, a subpicture header, a slice header, a tile header, and a superblock header.

In some embodiments, the decoder 122 determines a type of a downsampling filter 506 on a block level based on coded information. The downsampling filter 506 is applied to downsample the first luma sample 404C and the one or more neighboring luma samples 404X to generate the one or more downsampled luma samples 404D. The coded information includes one or more of: a distinct coded syntax value, a prediction mode, a block size, a quantization parameter, whether the current image frame is intra or inter coded, whether the first color sample is coded using intra block coding mode, and a palette coding mode.

In some embodiments, the decoder 122 applies a chroma-from-luma (CfL) filter 508 in a cross-component intra prediction (CCIP) mode to determine a first chroma sample 402C, which is collocated with the first luma sample 404C, based on a subset of the first luma sample 404C and the one or more neighboring luma samples 404X. The first sample offset 406 is generated based on one or more downsampled luma samples 404D and applied to adjust the first chroma sample 402C. Further, in some embodiments, the video bitstream 116 further includes a second syntax element 510 for a type of the CfL filter 508 applied in the CCIP mode.

In some embodiments, the first luma sample 404C and the one or more neighboring luma samples 404X are downsampled using a first downsampling filter 506 for the CCSO mode 408. The decoder 122 applies a second downsampling filter 506' to the first luma sample 404C or the first color sample 410 in a coding module 512 (e.g., a Wiener filter) distinct from a module associated with the CCSO mode 408. A type of the first downsampling filter matches a type of the second downsampling filter 506'. Stated another way, the same type of sampling filter is applied to downsample the luma samples 404 and generate the downsampled luma samples 404D, which are used in both the CCSO mode 408 and the coding module 512 (e.g., the Wiener filter). A first high-level syntax element 502 may be provided by the video bitstream 116 to define a type of a downsampling filter 506 applied to downsample the first luma sample 404C and the one or more neighboring luma samples 404X and generate the one or more downsampled luma samples 404D. The decoder 122 may apply a CfL filter 508 in a CCIP mode to determine a first chroma sample 402C based on a subset of the luma samples 404. A second syntax element 510 may be provided by the video bitstream 116 to define a type of the CfL filter 508 applied in the CCIP mode.

In some embodiments, the video bitstream 116 further includes a second high-level syntax element 514 selecting one or more classifiers 412 applied in the CCSO mode 408 to generate the first sample offset 406 of the first color sample 410 based on one or more luma samples 404. The second high-level syntax element 514 has a first predefined value (e.g., "0," "01," "10") indicating that the one or more classifiers 412 includes only a band offset classifier 412B and a second predefined value (e.g., "1," "11") indicating that the one or more classifiers 412 includes both the band offset classifier 412B and an edge offset classifier 412E. A first high-level syntax element 502 may be provided by the video bitstream 116 to define a type of a downsampling filter 506 applied to downsample the first luma sample 404C and the one or more neighboring luma samples 404X and generate the one or more downsampled luma samples 404D. The decoder 122 may apply a CfL filter 508 in a CCIP mode to determine a first chroma sample 402C based on a subset of the luma samples 404. A second syntax element 510 may be provided by the video bitstream 116 to define a type of the CfL filter 508 applied in the CCIP mode.

Further, in some embodiments, a first quantized value 404Q-1 is generated, and further applied by the band offset classifier 412E to classify the first color sample 410, based on (1) the one or more downsampled luma samples 404D or (2) a subset of the first luma sample 404C and the one or more neighboring luma samples 404X. The first color sample 410 is classified based on at least the first quantized value 404Q-1 to determine the first sample offset 406 of the first color sample 410.

In some embodiments, the video bitstream 116 further includes a third high-level syntax element 516 for a down-sampling mode when only a band offset classifier 412B is applied in the CCSO mode 408. The third high-level syntax element 516 has a plurality of predefined values including a first predefined value and one or more second predefined values. The first predefined value indicates that one or more quantized values 404Q (FIG. 4) are generated and further applied only by the band offset classifier 412E to classify the first color sample 410, based on a subset of the first luma sample 404C and the one or more neighboring luma samples 404X, e.g., without involving any downsampled luma sample 404D. The one or more second predefined values correspond to one or more types of a downsampling filter 506, and each second predefined value indicates that the one or more quantized values 404Q (FIG. 4) are generated, and further applied to classify the first color sample 410, based on the one or more downsampled luma samples 404D generated by a respective type of the downsampling filter 506.

In some embodiments, the video bitstream 116 further includes a fourth high-level syntax element 518 for a down-sampling filter mode indicating application conditions of the one or more downsampled luma samples 404D to a band offset classifier 412B and an edge offset classifier 412E, and the fourth high-level syntax element 518 corresponds to four predefined values (e.g., "00," "01," "10," "11") that are uniquely associated with four application conditions including: the band offset classifier alone (e.g., "10"), a combination of the band offset classifier and the edge offset classifier (e.g., "11"), the edge offset classifier alone (e.g., "01"), and no application of either the band offset classifier 412B or an edge offset classifier 412E (e.g., "00"). It is noted that, in some embodiments, both the band offset classifier 412B and an edge offset classifier 412E are applied, except that one of them is applied to process the one or more downsampled luma samples 404D and the other of them is applied to process the one or more luma samples 404 that are not downsampled.

Conversely, in some embodiments, the video bitstream 116 does not include the fourth high-level syntax element 518. Instead, the video decoder 122 determines, on one of a high level and a block level, application conditions of the one or more downsampled luma samples 404D to a band offset classifier 412B and an edge offset classifier 412E based on coded information. The coded information includes one or more of: a distinct coded syntax value, a prediction mode, a block size, a quantization parameter, whether the current image frame is intra or inter coded, whether the first color sample 410 is coded using intra block coding mode, and a palette coding mode. Based on the application conditions, one or more quantized values 404Q (FIG. 4) are generated, and further applied to classify the first color sample 410 based on at least the one or more downsampled luma samples 404D. The application condi-tions indicate whether the one or more downsampled luma samples 404D are used by the band offset classifier 412B, the edge offset classifier 412E, neither of them, or both of them. When the one or more downsampled luma samples 404D are used by neither of the band offset classifier 412B and the edge offset classifier 412E, an alternative offset filter 412B is used to process the one or more downsampled luma samples 404D and generate the first sample offset 406.

FIG. 6 is a flow diagram illustrating an example method 600 of coding video, in accordance with some embodiments. The method 600 may be performed at a computing system (e.g., the server system 112, the source device 102, or the electronic device 120 in FIG. 1) having control circuitry and memory storing instructions for execution by the control circuitry. In some embodiments, the method 600 is applied jointly with one or more video codecs, including but not limited to, H.264, H.265/HEVC, H.266/VVC, AV1 and AVS/AVS2/AVS3. In some embodiments, one or multiple filters are applied to the samples of the first component (e.g., luma samples 404) to derive the offset values of other components (e.g., chroma samples 402). Depending on the chroma format (e.g., for 4:2:0 chroma format), a downsampling filter 506 (FIG. 5) is applied (operation 608) to both horizontal and vertical directions. The downsampled samples of the first color sample (e.g., downsampled luma samples 404D) of the filtering process are used to compute (operation 610) the offset values 406 that are applied to the second color components (e.g., chroma samples 402). In some embodiments, the downsampling filter 506 is only applied on samples used by an edge offset classifier 412E (FIG. 4), whereas the band offset classifier 412E or a distinct alternative offset classifier 412A is not used with the downsampling filter 506. Stated another way, in some embodiments, the filtered downsampled samples (e.g., downsampled luma samples 404D) are used to provide inputs of the edge offset classifier 412E, and the reconstructed luma samples 404 (e.g., which are not downsampled) are used to provide inputs of the band offset classifier 412B or a distinct alternative offset classifier 412A.

Alternatively, in some embodiments, one or multiple downsampling filters 506 are applied to the samples of the one or more components, depending on the chroma format. For a 4:2:0 chroma format, the downsampling filter 506 is applied to both horizontal and vertical directions. The output samples of the filtering process are used to compute the offset values 406 (FIG. 4) that are applied to the second color components (e.g., chroma samples 402 or luma samples 404). The downsampling filter is only applied on the band offset classifier 412B, whereas the edge offset classifier 412E or a distinct alternative offset classifier 412A is not used with a downsampling filter 506. Stated another way, in some embodiments, the filtered and downsampled luma samples 404D are used to provide inputs of the band offset classifier 412B, and the reconstructed luma samples 404 (e.g., which are not downsampled) are used to provide inputs of the edge offset classifier 412E or the distinct alternative offset classifier 412A.

Alternatively, in some embodiments, one or multiple filters 506 are applied to the samples of the one or components, depending on a chroma format. For example, for a 4:2:0 chroma format, the downsampling is applied to both horizontal and vertical directions. The output samples of the filtering process are used to compute the offset values 406 that are applied to the second color components (e.g., luma samples 404, chroma samples 402). The downsampling filter is applied on all classifiers 412 used to generate the cross-component sample offset 406. For example, the downsampled luma samples 404D are used both for the edge offset classifier 404E and the band offset classifier 404B, which are used to generate the cross-component sample offset 406.

In an example, a filter type of the downsampling filter 506 is predefined and switchable depending on a high-level syntax (e.g., a first high-level syntax element 502 (FIG. 5)). The first high-level syntax element 502 may be signaled in one of: a sequence header, a picture header, a subpicture header, a slice header, a tile header, and a superblock header. In another example, a chrome from luma (CfL) prediction mode is used, and in this mode, a filter type flag (e.g., a second syntax element 510 (FIG. 5)) is used to indicate an associated CfL prediction type. Further, chroma from luma filters (e.g., downsampling filters 506) may be used, and a dedicated flag (e.g., first high-level syntax element 502) may be signaled and used to indicate an associated filter type. In yet another example, the type of the downsampling filter 506 is switchable at a block level depending on other coded information (e.g., other coded syntax value, prediction mode, block size, quantization parameter, whether it is intra or inter coded, whether it is coded using intra block coding mode, palette coding mode). In an example, other downsample filters that 506' (FIG. 5) are used in other coding module 512 (e.g., the filter used in Wiener filter) can be used in the downsampling filter 506 as well.

In some embodiments, a high-level flag is signaled to indicate whether the band offset classifier 412B or a combination of the band offset classifier 412B and the edge offset classifier 412E is used to derive the offset values 406. If a combination of the band offset classifier 412B and the edge offset classifier 412E is used, the downsampled luma samples 404D are optionally used with one or both of the classifiers 412B and 412E. If only the band offset classifier 412B is used, the classifier 412B is used with the downsampled luma samples 404D or the reconstructed luma samples 404 that are not downsampled. In an example, a high-level syntax (e.g., a third high-level syntax element 516 (FIG. 5)) may be signaled to indicate whether the band offset only branch is downsampled and the downsampling filter type. For example, an index in the range of 0-3 is signaled. An index equal to 0 indicates no downsampling. Indexes equal to 1-3 indicate three distinct downsampling filter types (e.g., a cross shape, an eight tap shape, a horizontal two tap shape).

In some embodiments, high-level flags (e.g., high-level syntax element 518) are signaled to indicate whether downsampling filters 506 are applied for a band offset classifier 412B alone, both the band offset classifier 412B and an edge offset classifier 412E, the edge offset classifier 412E alone, or neither of the band offset classifier 412B and an edge offset classifier 412E.

In some embodiments, whether downsampled luma samples 404D are applied with the band offset classifier 412E, the edge offset classifier 412E, and any alternative offset classifier 412A may be determined implicitly using coded information at a high level or at a lock level. The coded information may include, but not limited to, one or more of: other coded syntax value, prediction mode, block size, quantization parameter, whether it is intra or inter coded, whether it is intra only frame, whether it is coded using intra block coding mode, and palette coding mode.

It is noted that, in some embodiments, a Wiener filter refers to a loop filtering method that use a linear weighted sum of neighboring samples to derive a filtered sample value for the current sample. In some embodiments, the cross-component offset filtering method is an edge preserving loop filter that uses the reconstructed luma samples 404 to compute the sample offsets of luma components 404, chroma components 402, or both.

Although FIG. 6 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In some implementations, a method 600 is implemented for decoding video data. The method 600 includes receiving (operation 602) a video bitstream including a current image frame, where the video bitstream includes (operation 604) a first syntax element for a cross-component sample offset (CCSO)

mode indicating whether to generate a first sample offset of a first color sample of the current image frame based on one or more luma samples. The method 600 further includes identifying (operation 606) a first luma sample that is collocated with the first color sample and one or more neighboring luma samples of the first luma sample; downsampling (operation 608) the first luma sample and the one or more neighboring luma samples to generate one or more downsampled luma samples for the CCSO mode; determining (operation 610) the first sample offset of the first color sample based on the one or more downsampled luma samples; and reconstructing (operation 612) the current image frame at least by adjusting the first color sample based on the first sample offset.

(A2) In some embodiments of A1, determining the first sample offset of the first color sample further comprises generating (operation 614) one or more quantized values based on the one or more downsampled luma samples and classifying (operation 616) the first color sample based on the one or more quantized values to determine the first sample offset of the first color sample.

(A3) In some embodiments of A2, the CCSO mode corresponds to at least an edge offset classifier, and generating one or more quantized values based on the one or more downsampled luma samples further comprises, based on the edge offset classifier, determining that the one or more downsampled luma samples include a first downsampled luma sample and one or more neighboring downsampled luma samples; and determining one or more downsampled difference values between the one or more neighboring downsampled luma samples and the first downsampled luma sample. The one or more quantized values are generated based on the one or more downsampled difference values and applied by the edge offset classifier to classify the first color sample.

(A4) In some embodiments of A2 or A3, the CCSO mode corresponds to an edge offset classifier and an alternative classifier. The one or more quantized values include a first quantized value that is generated, and further applied by the edge offset classifier to classify the first color sample, based on the one or more downsampled luma samples. The one or more quantized values further include a second quantized value that is generated, and further applied by the alternative classifier to classify the first color sample, based on a subset of the first luma sample and the one or more neighboring luma samples. The first sample offset is determined based on an edge classification result and an alternative classification result.

(A5) In some embodiments of A2, the CCSO mode corresponds to at least a band offset classifier, and generating one or more quantized values based on the one or more downsampled luma samples further comprises, based on the band offset classifier, determining that the one or more downsampled luma samples include a first downsampled luma sample and one or more neighboring downsampled luma samples. The one or more quantized values are generated based on the one or more downsampled luma samples, and applied by the band offset classifier, to classify the first color sample.

(A6) In some embodiments of A2 or A5, the CCSO mode corresponds to a band offset classifier and an alternative classifier. The one or more quantized values include a first quantized value that is generated, and further applied by the band offset classifier to classify the first color sample, based on the one or more downsampled luma samples. The one or more quantized values further include a second quantized value that is generated, and further applied by the alternative classifier to classify the first color sample, based on a subset of the first luma sample and the one or more neighboring luma samples. The first sample offset is determined based on an edge classification result and an alternative classification result.

(A7) In some embodiments of A2, the CCSO mode corresponds to a plurality of offset classifiers, and generating one or more quantized values based on the one or more downsampled luma samples further comprises: determining that the one or more downsampled luma samples include a first downsampled luma sample and one or more neighboring downsampled luma samples. The one or more quantized values are generated based on the one or more downsampled luma samples, and applied by at least one of the plurality of offset classifiers, to classify the first color sample and generate a respective classification result. The first sample offset is determined based on a plurality of classification results including the respective classification result of at least one of the plurality of offset classifiers.

(A8) In some embodiments of A7, the plurality of offset classifiers include a band offset classifier and an edge offset classifier.

(A9) In some embodiments of any of A1-A8, the video bitstream further includes a first high-level syntax element for a type of a downsampling filter applied to downsample the first luma sample and the one or more neighboring luma samples to generate the one or more downsampled luma samples, and the first high-level syntax element is signaled in one of: a sequence header, a picture header, a subpicture header, a slice header, a tile header, and a superblock header.

(A10) In some embodiments of any of A1-A9, the method 600 further includes determining a type of a downsampling filter on a block level based on coded information, wherein the downsampling filter is applied to downsample the first luma sample and the one or more neighboring luma samples to generate the one or more downsampled luma samples. The coded information includes one or more of: a distinct coded syntax value, a prediction mode, a block size, a quantization parameter, whether the current image frame is intra or inter coded, whether the first color sample is coded using intra block coding mode, and a palette coding mode.

(A11) In some embodiments of any of A1-A10, the method 600 further includes applying a chroma-from-luma (CfL) filter in a cross-component intra prediction (CCIP) mode to determine a first chroma sample, which is collocated with the first luma sample, based on a subset of the first luma sample and the one or more neighboring luma samples.

(A12) In some embodiments of A1-A11, the video bitstream further includes a second syntax element for a type of the CfL filter applied in the CCIP mode.

(A13) In some embodiments of any of A1-A12, the first luma sample and the one or more neighboring luma samples are downsampled using a first downsampling filter for the CCSO mode. The method 600 further comprises applying a second downsampling filter to the first luma sample or the first color sample in a coding module distinct from the CCSO mode, wherein a type of the first downsampling filter matches a type of the second downsampling filter.

(A14) In some embodiments of any of A1-A13, the video bitstream further includes a second high-level syntax element selecting one or more classifiers applied in the CCSO mode to generate the first sample offset of the first color sample based on one or more luma samples. The second high-level syntax element has a first pre-defined value indicating that the one or more classifiers includes only a band offset classifier and a second predefined value indicating that the one or more classifiers includes both the band offset classifier and an edge offset classifier.

(A15) In some embodiments of A14, a first quantized value is generated, and further applied by the band offset classifier to classify the first color sample, based on (1) the one or more downsampled luma samples or (2) a subset of the first luma sample and the one or more neighboring luma samples. The method 600 further comprises classifying the first color sample based on at least the first quantized value to determine the first sample offset of the first color sample.

(A16) In some embodiments of any of A1-A15, the video bitstream further includes a third high-level syntax element for a downsampling mode when only a band offset classifier is applied in the CCSO mode. The third high-level syntax element has a plurality of predefined values including a first predefined value and one or more second predefined values. The first predefined value indicates that one or more quantized values are generated, and further applied only by the band offset classifier to classify the first color sample, based on a subset of the first luma sample and the one or more neighboring luma samples. The one or more second predefined values correspond to one or more types of a downsampling filter, and each second predefined value indicates that the one or more quantized values are generated, and further applied to classify the first color sample, based on the one or more downsampled luma samples generated by a respective type of the down-sampling filter.

(A17) In some embodiments of any of A1-A16, the video bitstream further includes a fourth high-level syntax element for a downsampling filter mode indicating application conditions of the one or more downsampled luma samples to a band offset classifier and an edge offset classifier, and the fourth high-level syntax element corresponds to four predefined values that are uniquely associated with four application conditions including: the band offset classifier alone, a combination of the band offset classifier and the edge offset classifier, the edge offset classifier alone, and no application of either the band offset classifier or an edge offset classifier.

(A18) In some embodiments of any of A1-A17, the method 600 further comprises: determining, on one of a high level and a block level, application conditions of the one or more downsampled luma samples to a band offset classifier and an edge offset classifier based on coded information, wherein the coded information includes one or more of: a distinct coded syntax value, a prediction mode, a block size, a quantization param-eter, whether the current image frame is intra or inter coded, whether the first color sample is coded using intra block coding mode, and a palette coding mode; and wherein based on the application conditions, one or more quantized values are generated, and further applied to classify the first color sample, based on the one or more downsampled luma samples.

(A19) In some embodiments of any of A1-A18, the first color sample is (operation 618) one of the first luma sample and a first chroma sample that is collocated with the first luma sample. Each of the first luma sample and the one or more neighboring luma samples includes a respective reconstructed luma sample, and the first chroma sample includes a first reconstructed chroma sample.

(A20) In some embodiments, a computing system includes control circuitry; and memory storing one or more programs configured to be executed by the con-trol circuitry. The one or more programs further com-prises instructions for receiving video data comprising a current image frame; encoding the current image frame; determining that a cross-component sample offset (CCSO) mode is enabled to generate a first sample offset of a first color sample of the current image frame based on one or more luma samples, wherein in the CCSO mode, the first sample offset of the first color sample is determined based on one or more downsampled luma samples that are generated by downsampling a first luma sample and one or more neighboring luma samples, and the first luma sample is collocated with the first color sample; transmitting the encoded current image frame via a video bitstream; and signaling, via the video bitstream, a first syntax element to indicate that the CCSO mode is applied to recon-struct the first color sample collocated with the first luma sample based on the first sample offset.

(A21) In some embodiments, a non-transitory computer-readable storage medium stores one or more programs for execution by control circuitry of a computing system. The one or more programs comprises instruc-tions for obtaining a source video sequence including a current image frame; and performing a conversion between the source video sequence and a video bit-stream, wherein the video bitstream comprises: the current image frame; and a first syntax element for a cross-component sample offset (CCSO) mode indicat-ing whether to generate a first sample offset of a first color sample of the current image frame based on one or more luma samples; wherein the first sample offset of the first color sample is determined based on one or more downsampled luma samples that are generated by downsampling a first luma sample and one or more neighboring luma samples, and the first luma sample is collocated with the first color sample.

In another aspect, some embodiments include a comput-ing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A21 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A21 above).

The proposed methods may be used separately or com-bined in any order. Further, each of the methods (or embodi-ments), encoder, and decoder may be implemented by processing circuitry (e.g., one or more processors or one or more integrated circuits). For example, the one or more processors execute a program that is stored in a non-transitory computer-readable medium. In the following, the term block may be interpreted as a prediction block, a coding block, or a coding unit, i.e., CU.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, comprising:
receiving a video bitstream including a current image frame, wherein the video bitstream includes a first syntax element indicating a downsampling index for a cross-component sample offset (CCSO) mode in which a first sample offset of a first color sample of the current image frame is generated based on one or more luma samples;
when the downsampling index is zero, reconstructing the current image frame without applying the CCSO mode; and
when the downsampling index is non-zero:
identifying a first luma sample that is collocated with the first color sample and one or more neighboring luma samples of the first luma sample;
downsampling, using a filter indicated by the downsampling index, the first luma sample and the one or more neighboring luma samples to generate one or more downsampled luma samples for the CCSO mode;
determining the first sample offset of the first color sample based on the one or more downsampled luma samples; and
reconstructing the current image frame at least by adjusting the first color sample based on the first sample offset.

2. The method of claim 1, wherein determining the first sample offset of the first color sample further comprises:
generating one or more quantized values based on the one or more downsampled luma samples; and
classifying the first color sample based on the one or more quantized values to determine the first sample offset of the first color sample.

3. The method of claim 2, wherein the CCSO mode corresponds to at least an edge offset classifier, and generating one or more quantized values based on the one or more downsampled luma samples further comprises, based on the edge offset classifier:
determining that the one or more downsampled luma samples include a first downsampled luma sample and one or more neighboring downsampled luma samples; and
determining one or more downsampled difference values between the one or more neighboring downsampled luma samples and the first downsampled luma sample;
wherein the one or more quantized values are generated based on the one or more downsampled difference values and applied by the edge offset classifier to classify the first color sample.

4. The method of claim 2, wherein:
the CCSO mode corresponds to an edge offset classifier and an alternative classifier;
the one or more quantized values include a first quantized value that is generated, and further applied by the edge offset classifier to classify the first color sample, based on the one or more downsampled luma samples; and
the one or more quantized values further include a second quantized value that is generated, and further applied by the alternative classifier to classify the first color sample, based on a subset of the first luma sample and the one or more neighboring luma samples; and
the first sample offset is determined based on an edge classification result and an alternative classification result.

5. The method of claim 2, wherein the CCSO mode corresponds to at least a band offset classifier, and generating one or more quantized values based on the one or more downsampled luma samples further comprises, based on the band offset classifier:
determining that the one or more downsampled luma samples include a first downsampled luma sample and one or more neighboring downsampled luma samples;
wherein the one or more quantized values are generated based on the one or more downsampled luma samples, and applied by the band offset classifier, to classify the first color sample.

6. The method of claim 2, wherein:
the CCSO mode corresponds to a band offset classifier and an alternative classifier;
the one or more quantized values include a first quantized value that is generated, and further applied by the band offset classifier to classify the first color sample, based on the one or more downsampled luma samples; and the one or more quantized values further include a second quantized value that is generated, and further applied by the alternative classifier to classify the first color sample, based on a subset of the first luma sample and the one or more neighboring luma samples; and the first sample offset is determined based on an edge classification result and an alternative classification result.

7. The method of claim 2, wherein the CCSO mode corresponds to a plurality of offset classifiers, and generating one or more quantized values based on the one or more downsampled luma samples further comprises:

determining that the one or more downsampled luma samples include a first downsampled luma sample and one or more neighboring downsampled luma samples;

wherein the one or more quantized values are generated based on the one or more downsampled luma samples, and applied by at least one of the plurality of offset classifiers, to classify the first color sample and generate a respective classification result;

wherein the first sample offset is determined based on a plurality of classification results including the respective classification result of at least one of the plurality of offset classifiers.

8. The method of claim 7, wherein the plurality of offset classifiers include a band offset classifier and an edge offset classifier.

9. The method of claim 1, further comprising:

applying a chroma-from-luma (CfL) filter in a cross-component intra prediction (CCIP) mode to determine a first chroma sample, which is collocated with the first luma sample, based on a subset of the first luma sample and the one or more neighboring luma samples.

10. The method of claim 1, wherein the first luma sample and the one or more neighboring luma samples are down-sampled using a first downsampling filter for the CCSO mode, the method further comprising:

applying a second downsampling filter to the first luma sample or the first color sample in a coding module distinct from the CCSO mode, wherein a type of the first downsampling filter matches a type of the second downsampling filter.

11. The method of claim 1, wherein the video bitstream further includes a second high-level syntax element selecting one or more classifiers applied in the CCSO mode to generate the first sample offset of the first color sample based on one or more luma samples, the second high-level syntax element having a first predefined value indicating that the one or more classifiers includes only a band offset classifier and a second predefined value indicating that the one or more classifiers includes both the band offset classifier and an edge offset classifier.

12. The method of claim 11, wherein a first quantized value is generated, and further applied by the band offset classifier to classify the first color sample, based on (1) the one or more downsampled luma samples or (2) a subset of the first luma sample and the one or more neighboring luma samples, the method further comprising:

classifying the first color sample based on at least the first quantized value to determine the first sample offset of the first color sample.

13. The method of claim 1, wherein:

the video bitstream further includes a third high-level syntax element for a downsampling mode when only a band offset classifier is applied in the CCSO mode;

the third high-level syntax element has a plurality of predefined values including a first predefined value and one or more second predefined values;

the first predefined value indicates that one or more quantized values are generated, and further applied only by the band offset classifier to classify the first color sample, based on a subset of the first luma sample and the one or more neighboring luma samples; and the one or more second predefined values correspond to one or more types of a downsampling filter, and each second predefined value indicates that the one or more quantized values are generated, and further applied to classify the first color sample, based on the one or more downsampled luma samples generated by a respective type of the downsampling filter.

14. The method of claim 1, wherein the video bitstream further includes a fourth high-level syntax element for a downsampling filter mode indicating application conditions of the one or more downsampled luma samples to a band offset classifier and an edge offset classifier, and the fourth high-level syntax element corresponds to four predefined values that are uniquely associated with four application conditions including: the band offset classifier alone, a combination of the band offset classifier and the edge offset classifier, the edge offset classifier alone, and no application of either the band offset classifier or an edge offset classifier.

15. The method of claim 1, further comprising:

determining, on one of a high level and a block level, application conditions of the one or more downsampled luma samples to a band offset classifier and an edge offset classifier based on coded information, wherein the coded information includes one or more of: a distinct coded syntax value, a prediction mode, a block size, a quantization parameter, whether the current image frame is intra or inter coded, whether the first color sample is coded using intra block coding mode, and a palette coding mode; and wherein based on the application conditions, one or more quantized values are generated, and further applied to classify the first color sample, based on the one or more downsampled luma samples.

16. The method of claim 1, wherein the first color sample is one of the first luma sample and a first chroma sample that is collocated with the first luma sample, and wherein each of the first luma sample and the one or more neighboring luma samples includes a respective reconstructed luma sample, and the first chroma sample includes a first reconstructed chroma sample.

17. A computing system, comprising:

control circuitry; and memory storing one or more programs configured to be executed by the control circuitry, the one or more programs further comprising instructions for:

receiving video data comprising a current image frame;

when a cross-component sample offset (CCSO) mode is not to be used for the current image frame, signaling, via a video bitstream, a syntax element with a value of zero;

when the CCSO mode is to be used for the current image frame:

encoding the current image frame using the CCSO mode to generate a first sample offset of a first color sample of the current image frame based on one or more luma samples, wherein:

in the CCSO mode, the first sample offset of the first color sample is determined based on one or more downsampled luma samples that are generated by downsampling a first luma sample and one or more neighboring luma samples, and the first luma sample is collocated with the first color sample;

transmitting the encoded current image frame via the video bitstream; and signaling, via the video bitstream, the syntax element with a value to indicate a filter to be used to perform the downsampling.

18. The computing system of claim 17, wherein determining the first sample offset of the first color sample comprises:

generating one or more quantized values based on the one or more downsampled luma samples; and classifying the first color sample based on the one or more quantized values to determine the first sample offset of the first color sample.

19. A method of generating a video bitstream, the method comprising:

when a cross-component sample offset (CCSO) mode is not to be used for a current image frame of video data, setting a syntax element with a value of zero; and when the CCSO mode is to be used for the current image frame:

encoding the current image frame using the CCSO mode to generate a first sample offset of a first color sample of the current image frame based on one or more luma samples, wherein, in the CCSO mode, the first sample offset of the first color sample is determined based on one or more downsampled luma samples that are generated by downsampling a first luma sample and one or more neighboring luma samples, and the first luma sample is collocated with the first color sample; and setting the syntax element with a non-zero value that indicates a filter to be used to perform the downsampling; and transmitting the video bitstream, wherein the video bitstream comprises the encoded current image frame and the syntax element.

20. The method of claim 19, wherein determining the first sample offset of the first color sample comprises:

generating one or more quantized values based on the one or more downsampled luma samples; and classifying the first color sample based on the one or more quantized values to determine the first sample offset of the first color sample.

21. The method of claim 19, wherein the video bitstream further includes a second high-level syntax element selecting one or more classifiers applied in the CCSO mode to generate the first sample offset of the first color sample based on one or more luma samples, the second high-level syntax element having a first predefined value indicating that the one or more classifiers includes only a band offset classifier and a second predefined value indicating that the one or more classifiers includes both the band offset classifier and an edge offset classifier.

* * * * *